J. ALFRED.
MOTOR VEHICLE.
APPLICATION FILED FEB. 5, 1915.
1,186,362.
Patented June 6, 1916.
2 SHEETS—SHEET 2.
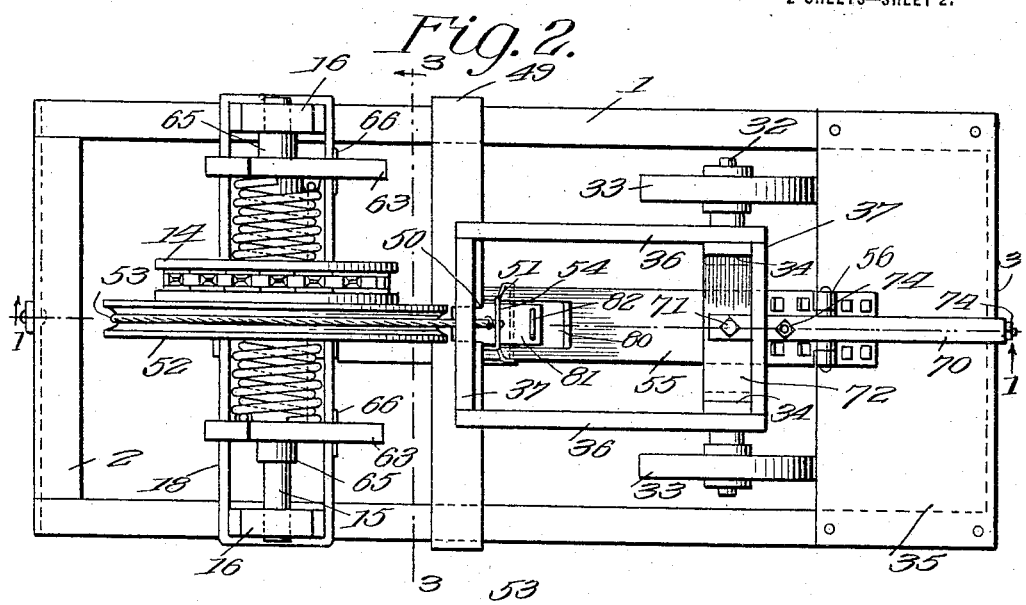
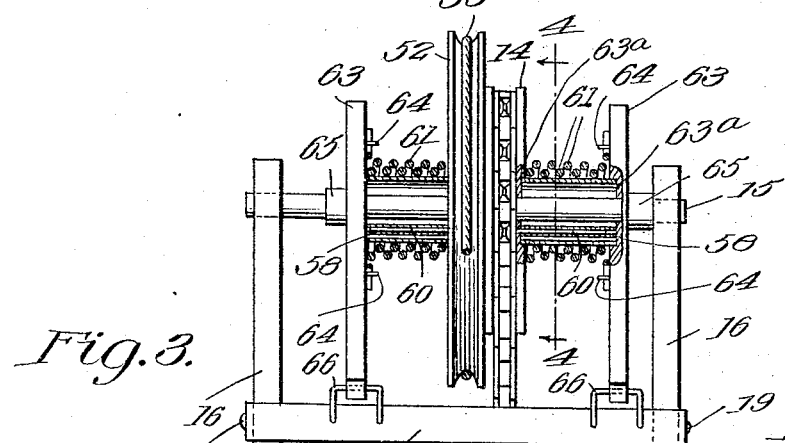
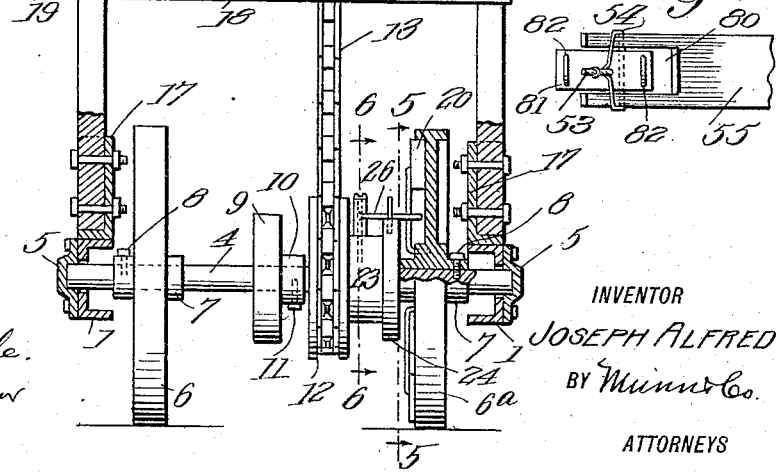
WITNESSES:
S. E. Wade.
C. E. Trainor
INVENTOR
JOSEPH ALFRED
BY Munn & Co.
ATTORNEYS

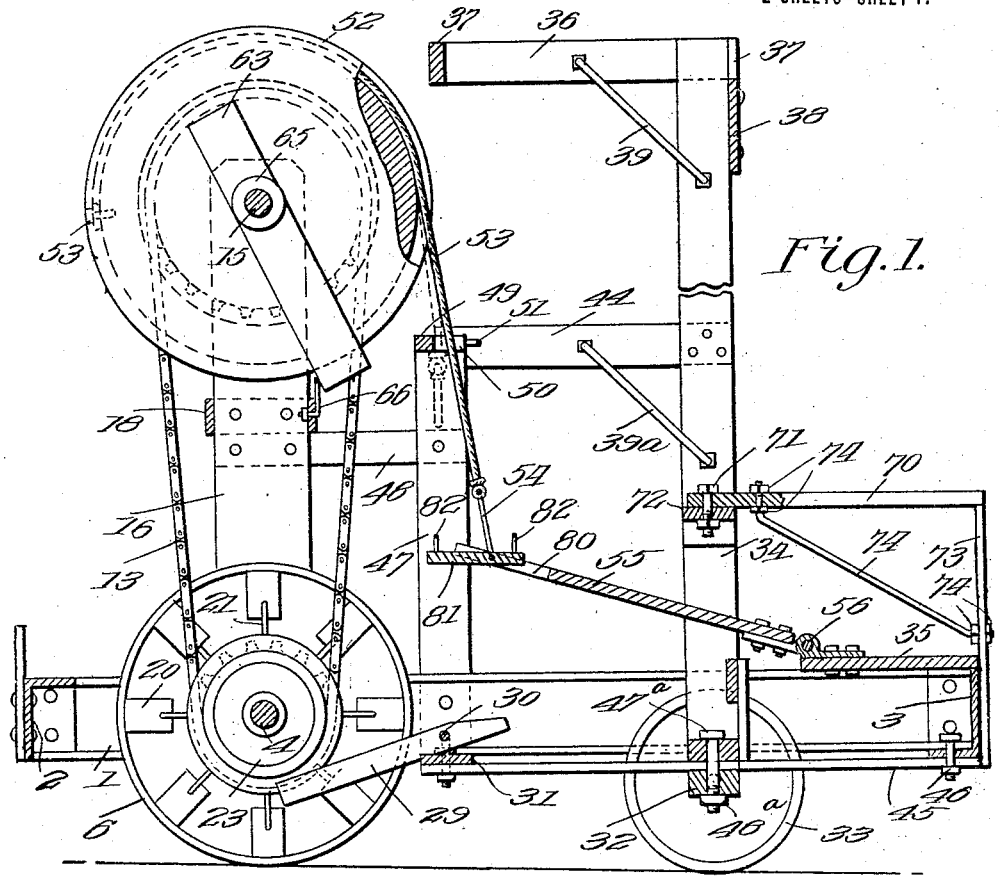

UNITED STATES PATENT OFFICE.

JOSEPH ALFRED, OF LYNDHURST, SOUTH CAROLINA.

MOTOR-VEHICLE.

1,186,362.  Specification of Letters Patent.  Patented June 6, 1916.

Application filed February 5, 1915. Serial No. 6,282.

*To all whom it may concern:*

Be it known that I, JOSEPH ALFRED, a citizen of the United States, and a resident of Lyndhurst, in the county of Barnwell and State of South Carolina, have invented a new and useful Improvement in Motor-Vehicles, of which the following is a specification.

My invention is an improvement in motors, and has for its object to provide a motor of the manually operated type, wherein a wheel supported carriage is provided, together with a spring controlled operating shaft connected to the wheels in a manner to drive the wheels forwardly when the operating shaft is rotated forwardly and to permit the operating shaft to move freely rearwardly without affecting the wheels, and wherein mechanism is provided for compressing the springs.

A further object is to provide steering mechanism for guiding the vehicle and brake mechanism to control the speed of the motor.

In the drawings:—Figure 1 is a section on the line 1—1 of Fig. 2, Fig. 2 is a top plan view, Fig. 3 is a section on the line 3—3 of Fig. 2, looking in the direction of the arrows adjacent to the line, Figs. 4, 5 and 6 are sections on the lines 4—4, 5—5 and 6—6, respectively, of Fig. 3, each looking in the direction of the arrows adjacent to the line, Fig. 7 is a perspective view of one of the reels, and Fig. 8 is a perspective view of a modified construction of treadle.

In the present embodiment of the invention a frame is provided of substantially rectangular form, the frame consisting of side plates 1 of channel material and connecting end plates 2 and 3 of angle material, as shown more particularly in Fig. 1. A shaft 4 is journaled transversely of the frame near one end of the frame, the ends of the shaft passing through openings in the side plates, and caps 5 are secured to the side plates at the outer sides thereof for engagement by the ends of the shaft, and the caps act as bearings for the shaft.

Wheels 6 and 6ª are secured to the shaft near the ends thereof, each wheel having a hub 7 fitting the shaft and secured thereto by means of a set screw 8. A wheel 9 is also secured to the shaft between the wheels 6 and 6ª, the said wheel having a hub 10 fitting on the shaft and held in place by a set screw 11.

Adjacent to the wheel 9 a sprocket wheel 12 is arranged on the shaft, and a chain 13 connects the wheel with a sprocket wheel 14 on a shaft 15, arranged directly above the shaft 4, and held in the upper ends of the uprights 16. Each of the uprights 16 has its lower end bolted to one of the portions of an angle plate 17, and the other portion of the angle plate rests upon the upper side edge of the adjacent side plate 1.

The uprights 16 are held in spaced relation and braced intermediate their ends by means of a loop or rectangular frame 18. The said loop incloses both uprights and extends transversely of the frame, and the ends of the loop are secured to the uprights by means of rivets 19 or the like.

Each of the wheels 6 and 6ª is solid as shown between the hub and the rim, and the wheel 6ª is provided on its inner face with a series of blocks 20, the blocks being radial with respect to the wheel and extending from the rim about half the distance to the hub. A rod 21 connects each block with the hub, each of the rods having at its ends angular portions which engage the hub and the block respectively.

A sleeve 23 is arranged on the shaft 4 between the sprocket wheel 12 and the wheel 6ª, and the said sleeve is provided at the end adjacent to the wheel 6ª with a marginal rib 24. A pair of pins 25 and 25ª extend radially from the rib, and a lateral arm 26 connected with a radial arm 27 engages between the pins. The arm 27 has a threaded stem 28 as shown in Fig. 6, and the said stem engages a radial opening in the sleeve near the opposite end from the rib 24. The arm 26 is of sufficient length to extend beyond the pins 25 and 25ª and into position to be engaged by the rods 21 of the wheels 6ª. The radial arm 27 is rotatable with respect to the drum, and is limited in its movement by the engagement of the arm 26 with the pins 25 and 25ª.

The wheel 9 is a brake sleeve or disk, and a brake lever 29 coöperates therewith. This lever is pivoted by means of a U-shaped clip 30 to a cross bar 31, which extends transversely of the frame below the side bars 1. An axle 32 is arranged near the opposite end of the frame from the shaft or axle 4, and wheels 33 are journaled on the ends of the axle.

Uprights 34 are connected with the axle 32 near the ends thereof, and it will be noted from an inspection of Fig. 1 that the axle is square in cross section. The axle 32 is of a length to fit within the main frame, that is, to fit between the side plates 1, and the wheels 33 are also within the frame.

The angle bars 2 and 3 are arranged with one portion vertical and the other horizontal, and the bar 2 has the horizontal portion at the top of the side members 1. The angle bar 3 on the contrary has the horizontal portion at the under side of the frame, and a plate or platform 35 is arranged transversely of the frame, resting at its ends on the tops of the bars 1 and having its outer side edge flush with the outer face of the vertical portion of the angle bar 3. The axle 32 is inside the inner edge of the plate or platform 35, and the uprights or standards 34 extend above the standards or uprights 16.

A substantially rectangular frame, consisting of side members 36 and end members 37 is connected with the upper ends of the standards or uprights 34, the frame 36—37 embracing the upper ends of the uprights at one end of the frame. A plate 38 connects the uprights or standards just below the frame 36—37 at the outer end thereof, and inclined braces 39 are arranged between the side members of the frame and the standards or uprights.

An arm 44 is secured to each upright intermediate its ends, and parallel with the adjacent side member 36 of the frame 36—37, and each arm is braced against the upright, by means of an inclined brace 39ª, corresponding in position and arrangement to the adjacent brace 39. The free ends of the arms 44 are notched at their under sides to engage the cross plate 49 when the uprights 34 are in the position shown.

The cross plate 31 before mentioned, is in the same plane with the horizontal portion of the angle bar 3, and this plate and the angle bar are connected by a longitudinally extending strip 45, the said strip passing through an opening in the axle 32. One end of the strip 45 is connected to the cross plate 31, by means of the clip 30 before mentioned, and the other end is connected to the angle bar 3 by means of a bolt and nut 46.

A king bolt 47ª is passed downwardly through the center of the axle and the strip 45, and a nut 48ª engages the bolt below the axle. Thus the axle 32 is pivoted with respect to the frame to swing at the transverse center thereof. Uprights or standards 47 extend upwardly from the side bars 1 between the uprights 16 and 34 and each upright 47 is braced against the adjacent upright or standard 16 by a cross bar 48. The tops of the uprights 47 are connected by a cross plate 49, and the said plate is notched at its center on the edge adjacent to the axle 32, as indicated at 50.

A substantially U-shaped guard 51 is connected with the cross plate at the notch, the body of the guard extending across the notch, while the arms of the guard engage the cross plate on opposite sides of the notch. A pulley 52 is arranged on the shaft 15 at approximately the center thereof, and a flexible member 53, as for instance, a rope or cable passes partially over the pulley, being secured to the pulley at one end as indicated at 53.

The other end of the flexible member engages a stirrup 54, and this stirrup may be, if desired, connected to a treadle 55, the stirrup being hinged to one end of the treadle, while the other end of the treadle is hinged to the platform 35 at the center thereof by means of a hinge 56.

The stirrup may swing with respect to the treadle, and the treadle is free to swing upward and downward on its hinge. The rope or cable 53 passes through the notch or recess 50 of the cross plate 49, and the guard 51 prevents displacement of the rope or cable from the notch.

The pulley 52 is arranged alongside the sprocket wheel 14, and is rigid therewith so that they turn together. Drums 57 are arranged on the shaft 15 at the outer sides of the wheels 14 and 52, and each drum is in the form of a cylindrical shell, being bent from sheet metal as shown in Fig. 7, and being of greater internal diameter than the diameter of the shaft 15. Each shell is formed by bending a sheet of suitable weight into cylindrical form with one of the edges overlapping the other, and that edge which is inside is beaded as shown at 58 to strengthen and reinforce the shell and for other purposes to be later mentioned.

A pair of springs 61 is arranged on each drum, the inner ends of one pair of springs being connected to the pulley 52, while the inner ends of the other pair are connected to the sprocket wheel 14, the connection in both cases being made by staples 62, which are inserted in the faces of the wheels over the ends of the springs. The outer ends of the springs are connected to torsion bars 63, journaled on the shaft 15 at the outer ends of the springs, by staples 64, arranged in the same manner as the staples 62. Each of the torsion bars 63 has a hub 65, engaging the shaft 15 and journaled thereon, and each torsion bar has its inner face recessed as indicated at 63ª for receiving the end of the adjacent cylinder. The pulley and the sprocket wheel are also recessed as shown in Fig. 4 for a similar purpose.

The hub or sleeve 65 of each torsion bar is nearer one end than the other, and the long ends of the bars extend downwardly and forwardly as shown in Fig. 1. The extremity of the long end of each bar rests upon a stop 66, connected with the front cross member of the frame 18, each of the stops being in the form of a staple.

The improved motor vehicle is designed for carrying the operator and his steersmen or the operator alone as may be required. In practice the wheels 6 and 6ᵃ are similar to bicycle wheels, having pneumatic tires and being of light construction. All of the shafts will be journaled in ball bearings, and the construction will be as light as may be consistent with strength. It will be obvious that the motor, that is, the vehicle may be large enough to carry as many as may be desired, but the heavier the vehicle the greater the power required to drive the same.

The sprocket wheel 12 and the sleeve 23 are rigid with each other, and are journaled loosely on the shaft 4. The wheels 6 and 6ᵃ, that is, the supporting wheels are secured to the shaft and rotate together. When the wheel 12 is rotated by the chain 13 in a manner to be presently described, the shaft 4 will be rotated in one direction with the wheel 12, while when the wheel 12 is moving in the opposite direction it will rotate without affecting the shaft 4.

The mechanism shown in Figs. 3, 5 and 6 and comprising the elements 25—26—27 and 20 is a pawl and ratchet connection for constraining the wheel 6ᵃ to move with the wheel 12 in one direction and permitting the wheel 12 to move freely in the opposite direction without affecting the wheel 6ᵃ. When the drum 23 is moved forwardly, the arm 26 engages a spoke or rod 21 and the rearmost pin 25ᵃ engages the arm 26, preventing this arm swinging rearwardly, and the wheel 6ᵃ is constrained to move forward with the drum. When the force tending to rotate the drum is relaxed the wheels 6ᵃ will move forward, and the arm 26ᵃ will be swept forward with the wheel, until it strikes the forward pin 25. The arm 26 when it strikes the forward pin 25 is far enough forward to permit the spokes 21 to pass the arm, and as a consequence the slowed movement of the drum does not slow the movement of the wheels 6ᵃ. It will be noticed that the pin 25ᵃ is in rear of the arm so that when the pin 25ᵃ contacts with the arm, the arm is almost or entirely parallel with the axle 4.

In operation the driver or motorman stands upon the side plate 1, or other convenient part of the main frame, within the frames 44 and 36—37 with the parts arranged in the position of Fig. 1. The driver's body is within these frames, and by means of his body he may guide the vehicle, turning the axle by means of the frames as above mentioned. In this position the operator will operate the treadle, it being understood that the driver faces the rear axle and not the front axle. Standing thus he will depress the treadle lever 55 to alternately lower and raise the same. When the treadle lever moves downwardly with the parts in the position of Fig. 1, the drums 57 will be rotated rearwardly and the springs 61 will be placed under tension, because of the engagement of the parts 63 with the stops 66. The arm 26 will slip idly over the rods 21, and when the treadle is released the spring 61 will immediately expand driving the pulley 52 and the sprocket wheel 14 forwardly which in turn will rotate the sleeve 23 in the same direction as the sprocket wheel 14. The drums 57 rotate on the shaft 15, which is fixed in its bearings. The rearmost pin 25ᵃ engages the arm 26, and the said arm 26 is held thus rigidly between the rod 21 and the radial pin 25ᵃ, and the sleeve 23 cannot move forwardly without moving also the wheel 6ᵃ adjacent thereto, and the car is driven forward by the springs 61. Every downward movement of the treadle lever 55 compresses the springs 61 and at every release of the treadle the car is driven forwardly. By operating the brake lever 29 the speed of the car may be nicely regulated and it may be stopped whenever desired. It will be understood that as many treadle levers may be provided as may be necessary to properly drive the car, the number of course, depending upon the weight of the car and the load to be carried.

The treadle lever 55 may be dispensed with if desired, the operator engaging the stirrup 54 directly with the foot. In this case the stirrup would have a vertical movement without any lateral swinging as with the treadle. The steering mechanism is preferably strengthened and reinforced by a reach bar 70, which is pivoted at one end by means of a bolt 71, to a cross bar 72, connecting the uprights 34 between the arms 44 and the axle 32. The reach bar extends forwardly to a rigid connection with a plate 73, connected to the front of the frame at the center thereof, and the reach bar is braced against the plate by an inclined metallic brace 74. The ends of the brace are threaded and bent at an angle to the body and passed through openings in the reach bar and plate, and are engaged by nuts 74 on opposite sides of the reach bar and the plate.

The particular arrangement of the drums 57 provides for a contractible or compressible axle or support for the springs 61. When the wheel 52 is rotated by the operator the springs 61 are strongly compressed, and they compress also the shells or drums, the lapping ends of the drums sliding upon each other to permit the compression. Since the drums are of resilient material they assist the expansive force of the spring. The shells since they contract and expand with the springs act at all times to support the spring from the inside, thus greatly reinforcing and strengthening not only the springs against breakage but also assisting them in their work. The particular arrangement of shell or drum thus lengthens the effective service of the springs.

Preferably the treadle 55 is provided at the end remote from the hinge with a longitudinal slot or recess 80, and a foot plate 81 is pivoted in the recess. The foot plate is provided with loops 82 at its ends, for engagement by the heel and toe of the operator, and the stirrup 54 connects the foot plate to the treadle. That is, the foot plate is hinged on the body of the stirrup, the body passing transversely of the recess 80.

It will be noted that the pivoted connection of the foot plate with the treadles is nearer the heel end of the treadle than the toe, and the foot of the operator passes through the stirrup. In Fig. 8 a top plan view of the foot plate and the adjacent portion of the treadle is shown, and it will be evident from the description and the showing that when the treadle is operated the foot plate will follow the movement of the foot, taking the strain off the ankle of the operator.

The shaft 15 is merely a bearing shaft for the drums 57 and the sprocket wheel 14 and pulley 52 are loose on the shaft. The bars 63 may turn with respect to the shaft 15, since they are journaled thereon but the tension of the springs will hold them in the position of Fig. 1.

I claim:

1. A motor vehicle, comprising a frame, an axle journaled transversely of the frame at one end, a steering shaft mounted at the opposite end to swing on a vertical axis with respect to the frame, wheels on the steering shaft, means for swinging the shaft, wheels secured on the first-named axle, a sleeve journaled on the axle, a pawl and ratchet connection between the one end of the sleeve and the adjacent wheel for constraining the wheel to move with the sleeve when the sleeve moves forwardly and for permitting the sleeve to move rearwardly free from the wheel, a driving shaft supported above the axle, a pulley journaled on the shaft, a drum at each side of the pulley on the shaft, springs on the drum, the springs of the drums being connected at their inner ends to the sprocket wheel and to the pulley, a torsion bar journaled on the shaft at the outer end of each drum to which the outer ends of the adjacent springs are secured, stops below the shaft for engagement by the ends of the torsion bars, means for rotating the pulley to tension the spring, and a driving connection between the pulley and the sleeve, said drums being compressible and expansible for the purpose specified.

2. A motor vehicle, comprising a frame, an axle journaled transversely of the frame at one end, a steering shaft mounted at the opposite end to swing on a vertical axis with respect to the frame, wheels on the steering shaft, means for swinging the shaft, wheels secured on the first-named axle, a sleeve journaled on the axle, a pawl and ratchet connection between the one end of the sleeve and the adjacent wheel for constraining the wheel to move with the sleeve when the sleeve moves forwardly and for permitting the sleeve to move rearwardly free from the wheel, a driving shaft supported above the axle, a pulley journaled on the shaft, a drum at each side of the pulley on the shaft, springs on the drum, the springs of the drums being connected at their inner ends to the sprocket wheel and to the pulley, a torsion bar journaled on the shaft at the outer end of each drum to which the outer ends of the adjacent springs are secured, stops below the shaft for engagement by the ends of the torsion bars, means for rotating the pulley to tension the spring, and a driving connection between the pulley and the sleeve.

JOSEPH ALFRED.

Witnesses:
JOHN C. FOWKE,
PERRY M. BUCKINGHAM.

Copies of this patent may be obtained for five cents each, by addressing the "Commissioner of Patents, Washington, D. C."